United States Patent
Forys et al.

[15] 3,703,999
[45] Nov. 28, 1972

[54] WIDE BAND STABILIZER

[72] Inventors: Edward Louis Forys, Pasadena; Leroy A. Lofftus, Glendale; Richard Milton Malueg, Glendora; Albert F. Montalbano, Alhambra, all of Calif.

[73] Assignee: Actron Industries, Inc.

[22] Filed: Dec. 12, 1969

[21] Appl. No.: 884,404

[52] U.S. Cl. ..................248/20, 95/12.5, 95/86, 188/1 B, 248/13
[51] Int. Cl. ............................................G03b 17/56
[58] Field of Search..........248/12, 13, 15, 18, 20, 21, 248/23, 358, 188.3, 188.2; 235/61.5 E; 180/41; 188/1 B; 95/12.5, 86

[56] References Cited

UNITED STATES PATENTS

| 2,148,937 | 2/1939 | Gerb | 248/20 X |
|---|---|---|---|
| 3,088,062 | 4/1963 | Hudimac | 248/358 X |
| 3,094,054 | 6/1963 | Moors et al | 95/12.5 |
| 3,310,263 | 3/1967 | Cavanaugh | 248/188.3 X |
| 3,464,657 | 9/1969 | Bullard | 248/20 |

*Primary Examiner*—J. Franklin Foss
*Attorney*—Golove & Kleinberg, Leonard Golove and Marvin H. Kleinberg

[57] ABSTRACT

For use in a system in which only translational motions of apparatus are acceptable, an apparatus stabilizing combination is disclosed which utilizes rotational motion sensors in combination with active, linear actuators to correct and compensate for "pitch" and "roll" forces. The suspension system includes the parallel combination of a low stiffness spring isolator with an active, linear motion device.

25 Claims, 7 Drawing Figures

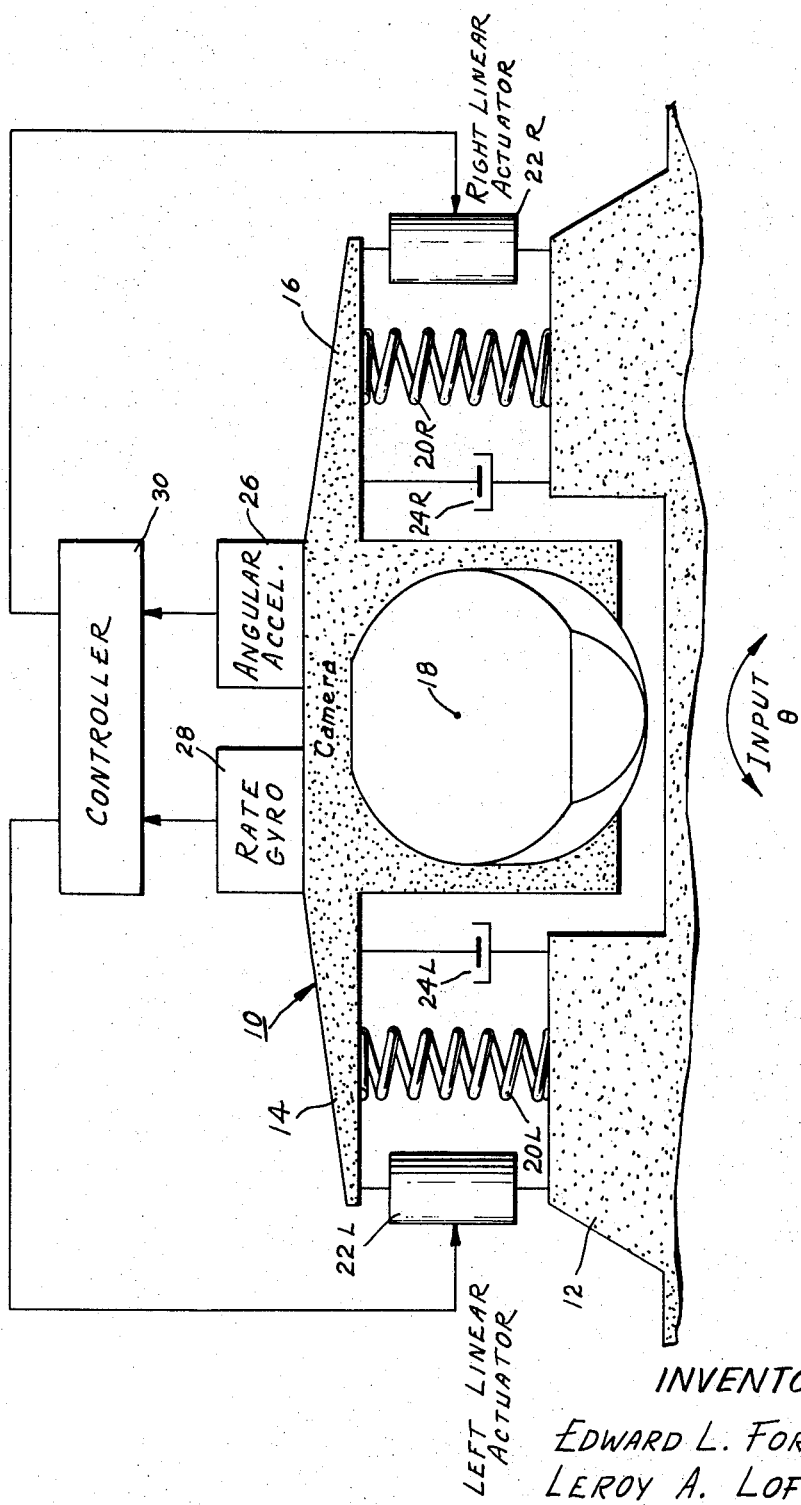

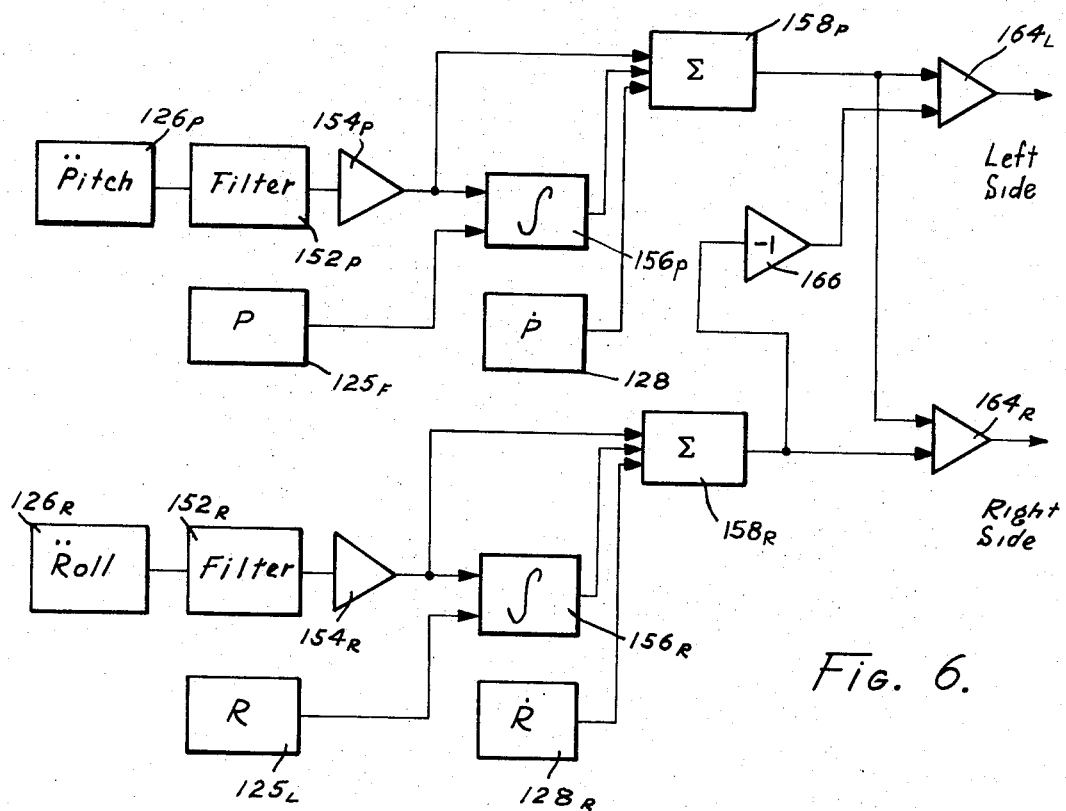
Fig. 6.
Fig. 2a.
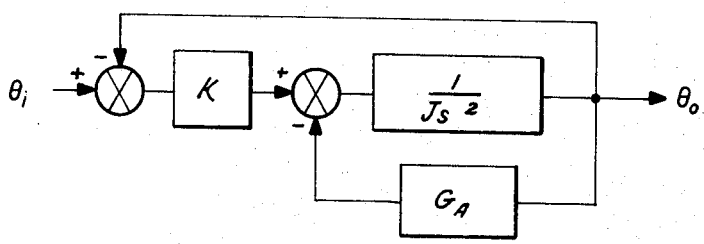
Fig. 2b.
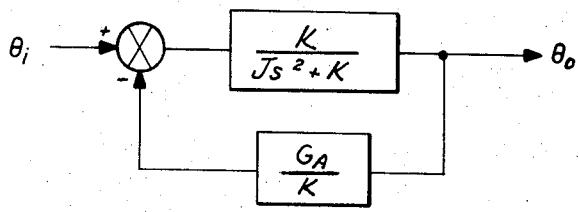

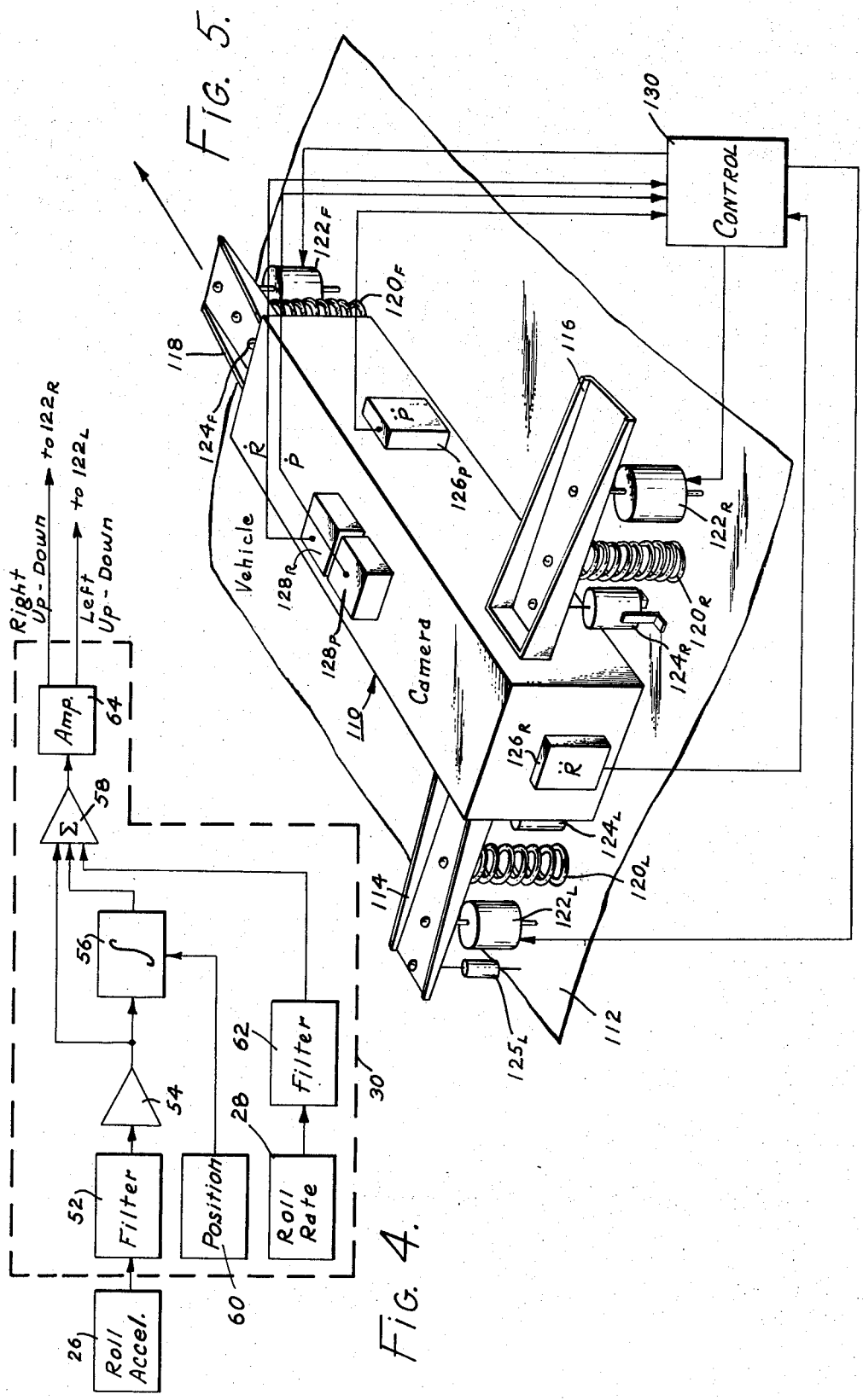

WIDE BAND STABILIZER

The present invention relates to stabilization systems and, more particularly, to apparatus for stabilizing sensitive equipment mounted on a moving vehicle against unwanted motions.

The problem of stabilizing sensitive equipment which is mounted on moving vehicles has long been one to which a great deal of attention has been shown. In the case of stabilized, inertial platforms, rather sophisticated mountings have been designed for isolating the platform from uncontrolled motions of the vehicle such as vibration, as well as pitch, roll, yaw and the like.

For a sensitive device such as a camera, most prior art systems, which are designed for use with inertial platforms, stabilize against either relatively slow (low frequency) or relatively fast (high frequency) movements, but not both, to neither of which are cameras particularly sensitive. Prior art, stabilized camera mounts such as is described in the patent to D. E. Moors, et al., U.S. Pat. No. 3,094,054, issued to the assignee of the present invention on June 18, 1963, tend to isolate the camera from a fairly complete spectrum of frequencies, but at the expense of substantial complexity.

In that patent, there was shown a three-axis, flexure gimbal system upon which the camera was mounted, which stabilized the camera against angular motion. The camera was movable about any of the three axes by appropriate "torquer solenoids," which were linear solenoids mounted such that they applied rotational torques to the camera about the several axes.

Any active isolator system, and especially one intended to isolate an airborne camera, should operate over a wide frequency range, and be sensitive to input vibrations as low as 0.01 HZ, since all inputs above this frequency must be attenuated. The isolator system should not have any points of resonance, since these will frequently amplify vibrational inputs to unacceptable levels of magnitude. Other considerations are those of size, weight, efficiency and reliability. Above all, the system must be fail-safe in the event of power failures, to avoid damage to the camera system.

Generally, the very low frequencies can be attenuated by gyroscopically controlled actuators that reject angular motion in pitch and roll, and, if necessary yaw. Most inertial platforms are very effective in this regard. It is, of course, understood, that inertial platforms tend to be rather insensitive to shock and vibration inputs which are generally attenuated by passive isolating mounts. The higher frequencies, greater than 100 Hz, are attenuated by such conventional, vibration isolating mounts whose resonance frequencies are generally in the range of 5 to 50 Hz.

The major problem exists in the intermediate band of frequencies of from 1 to 100 Hz. Motion inputs within this frequency range have generally been attenuated only with the use of complex gimbal systems, of the type shown in the Moors, et al., patent, supra.

A broad band, stabilizer system has been discovered that works satisfactorily over a very broad frequency spectrum. According to the present invention, low frequencies are attenuated by an active servo loop utilizing a rate gyro. Intermediate frequencies are attenuated by utilizing an angular accelerometer in the servo loop. The higher frequencies are attenuated by the inherent characteristics of passive spring isolaters.

According to a preferred embodiment of the present invention, a sensitive device such as an aerial camera is provided with a three point mounting. One mounting point is on the fore-aft axis of the camera, parallel to the direction of vehicle flight. The other two mounting points are aligned along an axis that is orthogonal to the flight path, and on respectively opposite sides of the camera center of gravity.

Linear actuators are provided at each mounting point in parallel with low stiffness, spring isolators which sustain the static weight of the camera. Mounted to the cameras are angular accelerometers and rate gyros which are sensitive to motions about the roll and pitch axes. In alternative embodiments, stabilization about the yaw axis can also be achieved with additional sensors and actuators aligned to correct for yaw motion.

An electronic controller system is coupled to receive the accelerometer, and the gyro outputs and applies energizing signals to the actuators, converting sensed motion signals into appropriate driving signals to effectively attenuate the sensed motion.

The combination of the linear actuators in parallel with the spring isolators, permits the use of a relatively "soft" spring, which is most effective for medium to high frequency vibration, and which substantially supports the camera. The linear actuators are therefore not required to support the weight of the camera system but only compensate for motions within the frequency range of interest.

In an alternative embodiment, a three-point mounting is utilized, but active actuator-isolator combinations are placed only at the points in parallel with the pitch axis. A passive spring isolator is utilized at the third mounting point, on the longitudinal or roll axis. In this embodiment, pitch motion is compensated for by simultaneously energizing the linear actuators in the "same" direction and roll motion is compensated for by simultaneously energizing the linear actuators in respectively opposite directions.

In other embodiments, "yaw" axis motions can be compensated for, and in yet other embodiments, a four point suspension system employing four actuator-isolator combinations compensate for unwanted rotational motions.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

FIG. 1 is a rear view of an aerial camera mounted in a vehicle according to the present invention;

FIG. 2 including FIGS. 2a and 2b is a simplified diagram of the feedback control system;

FIG. 4 is a block diagram of the electronic controller of FIG. 1;

FIG. 5 is a rear perspective view of an aerial camera mounted in a vehicle according to the preferred embodiment of the present invention, and FIG. 6 is a block diagram of the electronic controller of FIG. 5.

Figure 3:
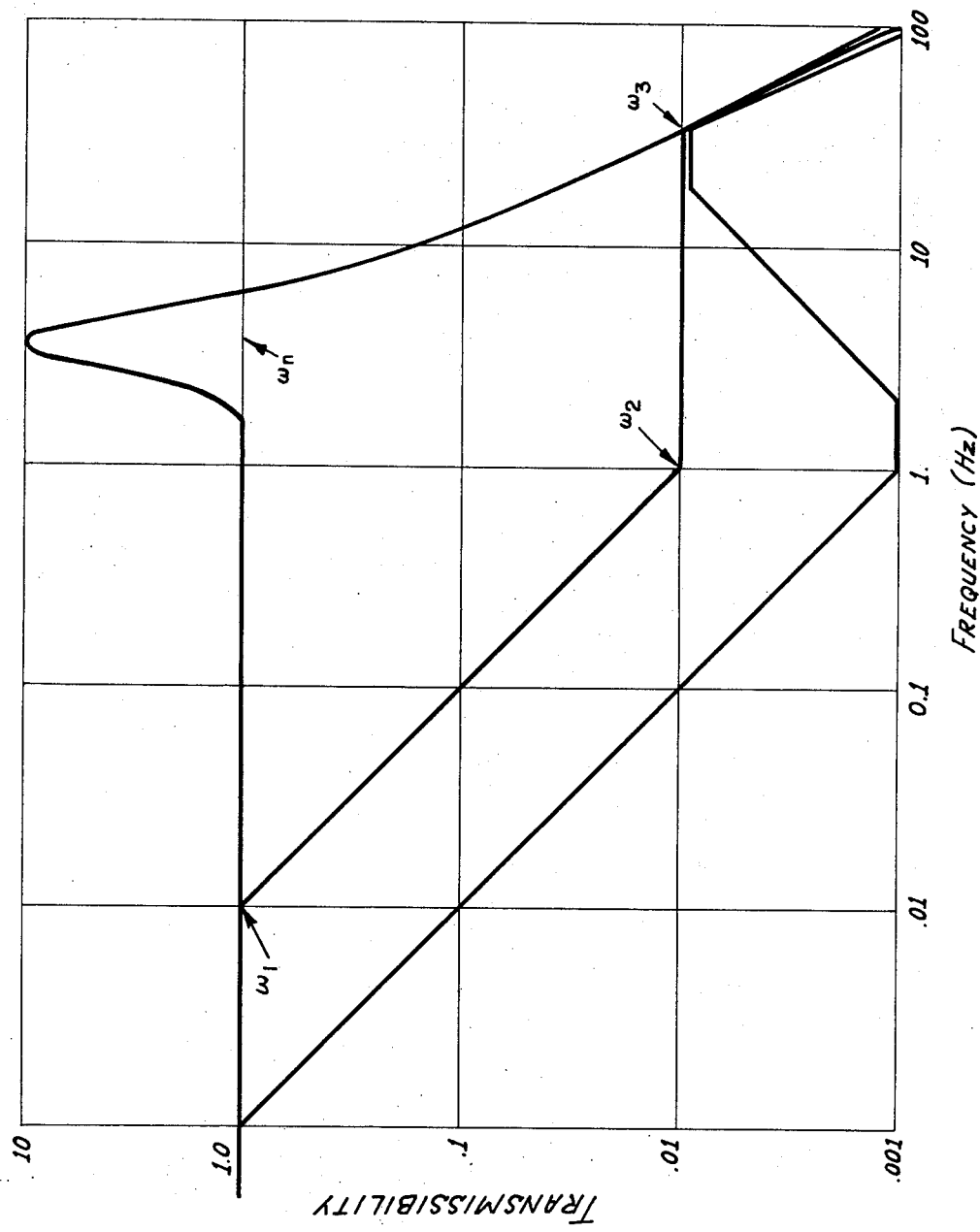
FIG. 3 is a graph of the transmissability of applied forces at varying frequencies.

Turning first to FIG. 1, there is shown a simplified diagrammatic view of a camera system mounted and instrumented to compensate for motion about the roll axis according to the present invention. A camera 10 is fastened to a mounting structure 12 which is integrally connected to the vehicle frame. In FIG. 1, the longitudinal vehicle axis is orthogonal to the plane of the figure. FIG. 1 may be considered a "rear" view of the camera, relative to the direction of flight. A left support member 14 and a right support member 16 are spaced outward of the camera 10, on opposite sides of the roll axis 18.

The camera 10 is actually supported on each side by the parallel combination of a spring-isolator 20, a linear actuator 22 and an optional damper element 24 which is placed between the mount 12 and the supporting members 15 and 16. For convenience, the elements on the left side of the camera will be designated with a subscript L and the comparable elements on the right side of the camera will be identified with a subscript R. Where specific identification is unnecessary, the elements will be identified without subscript.

Mounted on the camera body and appropriately positioned to be sensitive to motion in the "roll" direction, there is an angular accelerometer 26 and a rate gyro 28, connected to apply signals to an electronic controller 30. The controller 30 functions as an analog computer to provide driving signals to the linear actuators 22, to correct for sensed roll motions.

It will be clear that any motion about the roll axis will be sensed by both the accelerometer and the gyro. By calculating the parameters of a camera system, the magnitude of the motion compensating signal to be applied to the linear actuators can be mathematically determined. Any sensed roll motion can therefore be reduced substantially by simultaneously applying a torque to the camera in the opposite direction, thereby reducing to negligible levels the net torque applied to the camera 10. This is accomplished by energizing the linear actuators to move in respectively opposite directions, rotating the camera 10 about its roll axis to oppose the applied motion.

The rate gyro 28 is adequate to detect the relatively slow, low frequency motions, representing changes in vehicle altitude. The gyro 28 signals these changes to the controller 30 which signals the actuators to provide compensating motions to counter the motion input to the camera 10. The accelerometer 26 is better able to sense and respond to the higher frequency roll motions, such as might result from components of vibration in the roll direction.

The controller 30 functions primarily as a form of analog computer which operates upon acceleration (rate of change of the rate of change of position), and velocities (rate of change of position) to derive an appropriate driving signal. Further, a driving signal should, for the correction of roll forces, be of equal magnitude but of opposite polarity with respect to the two linear actuators 22. The system is stabilized in that the accelerometer 26 and gyro 28 both sense the roll motion imparted to the camera 10, by the operation of the linear actuators 22.

The following mathematical treatment of the problem will illustrate the underlying mathematical basis for this approach.

Turning next to FIG. 2, there is shown a basic block diagram of the feedback control system which represents the active isolater system of the present invention. For these computations, the basic assumption is made that there is no damping in the rotational modes, which of course is limited to the ideal case.

In the diagram. $\theta_i$ represent the rotation into the system and $\theta_o$ represent the output of the system, both referred to inertial space. The various blocks within the servo loop include: K, representing the rotational spring constant, J, representing inertia of the system and $G_A$, which is the acceleration feedback transfer function.

In FIG. 2b, the diagram of FIG. 2a has been rearranged and simplified into a combination of a forward transfer function and feedback function. The forward function is rewritten as $(K/J_s^2+K)$ and the feedback function can be expressed as $G_A/K$. In FIG. 3, there is shown a graph of a desired transmissibility with the transfer ratio as the ordinate and frequency as the abscissa, both to logarithmic scales. The transfer function can be expressed as:

$$\frac{\theta_o}{\theta_i} = \frac{\left(\frac{s}{\omega_2}+1\right)}{\left(\frac{s}{\omega_1}+1\right)\left(\frac{s}{\omega_3}+1\right)^2} \qquad (1)$$

FIG. 3 represents the desired response of the system and, with reference to FIG. 3, $\omega_1$ represents the lower cut-off frequency, above which the active angular motion attentuator loop is operative, $\omega_2$ represents the frequency above which the attenuation of the loop is substantially constant, $\omega_n$ corresponds to the natural resonant frequency of the spring isolator, and $\omega_3$ represents the frequency at which the attenuation contribution of the active loop is substantially less than the contribution of the passive, spring isolator.

If now the desired transmissability, as expressed in FIG. 3, is to be equated with the closed loop response, represented by the servo loop block diagram of FIG. 2b, the equation, when solved for $G_A(s)$, would provide the feedback necessary for the desired attenuation.

Accordingly, the transfer function of Equation (1) can be re-drawn as a function of $s$ as in:

$$\frac{\theta_o(s)}{\theta_i(s)} = \frac{\left(\frac{1}{\omega_2}s+1\right)}{\left(\frac{1}{\omega_1}s+1\frac{1}{\omega_3}s+1\right)^2} \qquad (2)$$

which is equal to:

$$= \frac{\frac{K}{Js^2+K}}{1+\left(\frac{K}{Js^2+K}\right)\left(\frac{G_A}{K}\right)} \qquad (3)$$

This quantity can be reduced to:

$$= \frac{K}{Js^2+K+G_A} \qquad (4)$$

Solving for the transfer function $G_A$, we have:

$$G_A = \frac{K\left(\frac{1}{\omega_1}s+1\right)\left(\frac{1}{\omega_3}s+1\right)^2}{\left(\frac{1}{\omega_2}s+1\right)} - (Js^2+K) \qquad (5)$$

which simplifies to:

$$G_A = \frac{K\left[s^3\left(\frac{1}{\omega_1\omega_3^2}-\frac{J}{K\omega_2}\right)+s^2\left(\frac{2}{\omega_1\omega_3}+\frac{1}{\omega_3^2}-\frac{J}{K}\right)+s\left(\frac{1}{\omega_1}-\frac{1}{\omega_2}+\frac{2}{\omega_3}\right)\right]}{\frac{1}{\omega_2}s+1} \qquad (6)$$

On examining the co-efficient of the $s^3$ term, it may be noted that $\omega_n$ is equal to $$\sqrt{\frac{K}{J}}$$

which is the natural frequency of the spring mass. Substituting in the co-efficient term produces:

$$\left(\frac{1}{\omega_1\omega_3^2}-\frac{J}{K\omega_2}\right)=\frac{1}{\omega_1\omega_3^2}-\frac{1}{\omega_n^2\omega_2} \quad (7)$$

From FIG. 3, it may be ascertained that $$\omega_3=\sqrt{\frac{\omega_2}{\omega_1}}\omega_n \quad (8)$$

Substituting for $\omega_3$:

$$\frac{1}{\frac{\omega_1\omega_2\omega_n^2}{\omega_1}}-\frac{1}{\omega_n^2\omega_2}=0 \quad (9)$$

it is seen that the coefficient of $s^3$ goes to zero and the $s^3$ term drops out.

Finally, the Laplace transform of the transfer function then becomes:

$$G_A(s)=\frac{K\left[s_2\left(\frac{2}{\omega_1\omega_3}+\frac{1}{\omega_3^2}-\frac{1}{\omega_n^2}\right)+s\left(\frac{1}{\omega_1}-\frac{1}{\omega_2}+\frac{2}{\omega_3}\right)\right]}{\frac{1}{\omega_2}s+1} \quad (10)$$

From a careful examination of Equation (10), it may be seen the expression includes an acceleration term:

$$s^2\left(\frac{2}{\omega_1\omega_3}+\frac{1}{\omega_3}-\frac{1}{\omega_n^2}\right) \quad (11)$$

a velocity, or rate term:

$$s\left(\frac{1}{\omega_1}-\frac{1}{\omega_2}+\frac{2}{\omega_3}\right) \quad (12)$$

and a displacement term in the denominator:

$$\frac{1}{\left(s\frac{1}{\omega_2}+1\right)} \quad (13)$$

This transfer function can then be mechanized utilizing a circuit that accepts the output of the angular accelerometer, an integrator to derive an angular rate term which may be combined with the input from the rate gyro, a position term which can be derived from a position transducer, and which also can be used as an "offset" to balance the offset of the integrator and a circuit which mechanizes the frequency compensating term.

In a practical implementation of the stabilizer, one can add the rate gyro signal, intended for low frequency stabilization, and position feedback intended to retain the long term relative position accuracy of the camera, and simultaneously diminish any electronic offsets due to integrator drift. In other implementations, it can be seen by observing FIG. 3 that any one of an infinite number of performance curves might be selected, within the limitations of the equipment and similarly any natural frequency might be used.

Under these circumstances an infinite number of combinations of acceleration, integral of acceleration, rate, and position might be used to stabilize the sensitive instrument. As an example, one can use pure acceleration feedback and frequency shaping to yield a second order rolloff slope between $\omega_1$ and $\omega_2$ in FIG. 3, rather than the first order rolloff shown. Further, a position transducer may be used to identify the null or balance point about which the camera is to be stabilized.

Turning next to FIG. 4, there is shown an electronic block diagram of a suitable circuit for mechanizing the controller 30 shown in FIG. 1. The roll accelerometer 26 applies its signal to a filter circuit 52 which performs a rolloff function. The output of filter 52 is applied to an amplifier 54, the output of which is applied to an integrator 56 and to one input of a summing amplifier 58.

A position transducer 60 is mounted between one of the pair of support members 14, 16, and the mounting structure 12. The signal output of the position transducer 60 is applied to a summing junction at the input of the integrator circuit 56.

The roll rate gyro 28 is connected to apply its input to a second, rolloff filter 62, the output of which is applied to a summing junction at the output of integrator 56. The combined output of the integrator 56 and the rolloff filter 62 is applied to the other input of the summing amplifier 58. The summing amplifier 58 drives a roll power amplifier 64 which, in turn, provides a first energizing output to the right linear actuator $22_R$ and a second output of equal magnitude but opposite polarity to the left linear actuator $22_L$.

By a judicious selection of components and circuit values, the various elements of the controller 30 can mechanize the comparable elements of the Laplace transform of the transfer function of Equation (10). More particularly, the acceleration term [Equation (11)] is produced in the summing amplifier 58, the velocity term [Equation (12)] can be created at the output of the integrator 56, and the displacement term [Equation (13)] is generated at the output of the filter 52.

A similar network can be provided to control a third linear actuator, positioned at the "forward" end of the camera in parallel with a spring isolator. In conjunction with a wholly independent combination of a rate gyro and angular accelerometer intended to signal pitch motions, appropriate signals can be derived to correct for such pitch motions and applied to the third linear actuator.

Turning next to FIG. 5, there is shown an idealized perspective view of a camera system according to the preferred embodiment of the present invention, in which both pitch and roll motions are detected and compensated for. A camera 110 is provided with a three-point suspension system which couples it to a camera mount 112 that is firmly connected to the vehicle.

As in the embodiment of FIG. 1, left and right hand mounting support members 114 and 116 are provided, by which the camera 110 is supported at its "aft" end. At the "forward" end, relative to the line of flight, a similar, forward extending member 118 is provided, which is substantially aligned with the flight axis.

Isolator springs $120_L$ and $120_R$ are provided between the support member 114 and 116 and the mount 112 respectively. Similarly, at the "forward" end, a third isolator spring $120_F$ is also provided, in this case the subscript F representing the components of the single, forward mounting. In parallel with each of the spring isolators 120, is corresponding linear actuator 122, including a left linear actuator $122_L$, a right linear actuator $122_R$ and a forward linear actuator $122_F$.

Motions within the desired frequency range are attenuated through the use of linear actuators 120. Dampers 124 are provided in parallel with the linear actuators 122 and springs 120 at each of the mounting points, and are identified by a suitably subscripted reference numerals. Damping may also be accomplished through the use of the actuators in combination with transducers signalling relative displacement or relative linear velocity of the actuators.

In at least one location in the "aft" end of the camera, shown here as on the left side, and at the "forward" end, are placed a pair of position transducers $125_L$, $125_F$. These provide the references for stabilization as well as position offset when nulling the outputs of integrators within the controller 130.

A pitch rate gyro $128_P$ and a roll rate gyro $128_R$ are mounted to the top of the camera 110. A pitch angular accelerometer $126_P$ and a roll angular accelerometer $126_R$ are also mounted to the camera body, at positions relatively sensitive to the pitch and roll motions to be detected. The controller 130 is connected to receive the inputs from all of the various transducers. Output signals are generated which are then applied to drive the several actuators 122.

Appropriate mathematical equations provide the desired transfer function for pitch correction and circuits, similar to those set forth in FIG. 4 above, can mechanize the transfer function. Such a system then compensates for both pitch and roll.

In an alternative embodiment, it has been noted that a forward linear actuator could be omitted by modifying the circuits so that both pitch and roll are compensated for with the two linear actuators that have been heretofore utilized for roll correction. That is, the differential application of equal but oppositely poled energizing impulses to the linear actuators provide a roll torque to counter an applied roll disturbance. However, it has been noted that the simultaneous application of energizing signals, of equal magnitude and similar polarity, to the aft end of the camera provides a pitch torque about the forward isolator as a pivot point.

Turning next to FIG. 6, there is shown a schematic block diagram of a circuit suitable for correcting pitch and roll with a single pair of linear actuators.

It will be obvious from inspection that the pitch and roll correcting circuits are substantially identical to the circuit set forth in FIG. 4, and are substantially identical to each other. The output of the pitch circuit summing amplifier $158_P$ is applied to both a left side driving amplifier $164_L$ and a right side driving amplifier $164_R$. However, the output of the roll summing amplifier $158_R$ is applied directly to the right side amplifier $164_R$ but through an inverting amplifier 166 to the left side amplifier $164_L$.

The pitch correcting signals are equally applied to both the right and left linear actuators, simultaneously raising or lowering the aft end of the camera 110 to correct for applied pitch motion. Similarly, the roll circuits apply equal but oppositely poled signals to the linear actuators to produce a compensatory roll torque in response to applied roll inputs.

Thus there has been shown in alternative embodiments, a system for isolating a load from pitch and roll forces that are in a frequency range below that which can be easily attenuated by the conventional passive spring isolators. The frequencies of interest here are too high to be considered planned deviations in orientation and, in general, are within the frequency range of the resonance frequencies of the passive isolators.

Unlike many active isolator systems, the system of the present invention utilizes an actuator in parallel with a passive spring isolator, which places substantially the entire static load on the springs, and requires only that the actuators supply correcting forces. Further, the individual linear actuators are intended to be substantially frictionless when de-energized so as not to adversely effect the isolating characteristics of the spring members.

The use of rotational sensors and, more particularly, an angular accelerometer to detect rotational motion, in combination with linear actuators to provide restoring forces, appears to furnish a significant improvement over prior art systems that utilize rate gyro sensors in combination with linear actuators, or, for that matter rotational actuators. Further, the invention appears to offer a significant improvement in performance over systems which utilize linear sensors in combination with rotational actuators, such as are to be found in conventional, inertial, "stable" platforms.

In other systems, where the camera must be purposely pitched to provide Velocity/Height (V/H) correction, the pitch rate gyro can be biased with a V/H command signal, thereby forcing the forward actuator to provide the V/H correction in addition to stabilization forces. In still other applications, where it is desired to stabilize a mass in one axis of translation, a linear accelerometer can be used in conjunction with the linear actuator and soft spring. Theoretically, considering the six degrees of freedom available to a body in inertial space, some 55 combinations of possible inputs can be controlled. If a switching a mode is added in which the stabilizer system is rendered active only during exposure intervals and deactivated between exposures, the number of combinations, not counting the V/H combinations, is doubled.

What is claimed as new is:

1. In combination with apparatus to be stabilized against motion in a predetermined rotational direction, motion compensation means comprising in combination:
    a. static support means coupling the apparatus to a supporting frame in a translational direction including a relatively compliant, resilient member;
    b. dynamic correcting means including an actuator in parallel with said resilient member;
    c. motion sensing means, coupled to the apparatus for signalling movement of the apparatus in the predetermined rotational direction; and
    d. feedback control means connected to said motion sensing means and said dynamic correcting means for generating output signals to drive said dynamic correcting means in accordance with a predetermined function of said motion sensing means output,
    whereby said actuator applies restoring torques to the apparatus to oppose applied torques in the predetermined rotational direction.

2. Apparatus of claim 1, wherein said motion sensing means include a rate gyro sensitive to motion of the apparatus in the predetermined rotational direction.

3. Apparatus of claim 1, wherein said motion sensing means include an accelerometer sensitive to accelerations of the apparatus in the predetermined rotational direction.

4. Apparatus of claim 3, wherein said motion sensing means further include a rate gyro sensitive to motion in the predetermined rotational direction.

5. Apparatus of claim 1, wherein said static support means resilient member is a spring member.

6. Apparatus of claim 1, wherein said dynamic correcting means actuator is a solenoid device adapted to apply a torque in a first direction.

7. Apparatus of claim 6, above, wherein said static support means resilient member is a spring.

8. Apparatus of claim 7, above wherein said motion sensing means include a rate gyro sensitive to rotational motions of the apparatus having a motion component in said first direction.

9. Apparatus of claim 7, above wherein said motion sensing means include an accelerometer sensitive to rotational accelerations of the apparatus having a component in said first direction.

10. Apparatus of claim 9, above wherein said motion sensing means further include a rate gyro sensitive to rotational motions of the apparatus having a motion component in said first direction.

11. In combination with apparatus to be stabilized against motion in a predetermined translational direction, motion compensation means comprising in combination:
  a. static support means coupling the apparatus to a supporting frame in a rotational direction including a relatively compliant, resilient member;
  b. dynamic correcting means including an actuator in parallel with said resilient member;
  c. motion sensing means, coupled to the apparatus for signalling movement of the apparatus in the predetermined translational direction; and
  d. feedback control means connected to said motion sensing means and said dynamic correcting means for generating output signals to drive said dynamic correcting means in accordance with a predetermined function of said motion sensing means output, whereby said actuator applies restoring forces to the apparatus to oppose applied forces in the predetermined translational direction.

12. Apparatus of claim 11, wherein said motion sensing means include a velocity transducer sensitive to motion of the apparatus in the predetermined direction.

13. Apparatus of claim 11, wherein said motion sensing means include an accelerometer sensitive to accelerations of the apparatus in the predetermined direction.

14. Apparatus of claim 13, wherein said motion sensing means further include a velocity transducer sensitive to motion of the apparatus in the predetermined direction.

15. Apparatus of claim 11, wherein said static support means resilient member is a spring member.

16. Apparatus of claim 11, wherein said dynamic correcting means actuator is a solenoid device adapted to apply a force in a first translational direction.

17. Apparatus of claim 16, above, wherein said static support means resilient member is a spring.

18. Apparatus of claim 17, above, wherein said motion sensing means include a velocity transducer sensitive to translational motion of the apparatus having a motion component in said first direction.

19. Apparatus of claim 17, above, wherein said motion sensing means include an accelerometer sensitive to accelerations of the apparatus having a component in said first direction.

20. Apparatus of claim 19, above, wherein said motion sensing means further include a velocity transducer sensitive to translational motion of the apparatus having a motion component in said first direction.

21. In combination with apparatus to be stabilized against rotational movement about a predetermined one of three mutually orthogonal axes, motion compensation means comprising in combination:
  first and second support means including a parallel combination of linear actuator means and resilient static support means aligned parallel to the predetermined direction adapted to couple the apparatus to a supporting frame, said first and second support means being aligned in a first plane orthogonal to the predetermined axis;
  rotational motion sensing means connected to the apparatus for generating signals corresponding to and representative of apparatus rotational motion about the predetermined axis; and
  feedback control means connected to said rotational motion sensing means and to said first and second support means, operable in response to said signals for driving said linear actuator means to oppose any component of sensed motion in the first plane.

22. Apparatus of claim 21, wherein said rotational motion sensing means are adapted to sense roll about an axis in said first plane orthogonal to said aligned first and second support means.

23. Apparatus of claim 21 wherein said rotational motion sensing means are adapted to sense pitch about an axis in said first plane parallel to said aligned first and second support means.

24. The motion compensation means of claim 23, above, further including means for stabilizing the apparatus against rotational movement about a roll axis, orthogonal to the pitch axis,
  wherein said rotational sensing means generate additional signals corresponding to and representative of apparatus rotational motion about the roll axis and said feedback control means are operable in response to said signals and said additional signals for driving said actuator means in the same direction to oppose applied pitch motions and in respectively opposite directions to oppose applied roll motions.

25. The motion compensation means of claim 21, for stabilizing against rotational motion about a second one of said three mutually orthogonal axes, further including:
  third support means including a parallel combination of linear actuator means and resilient static support means aligned along the predetermined axis;
  said rotational sensing means further including additional sensors for generating further signals corresponding to and representative of apparatus rotational motions about the second axis; and
  wherein said feeback control means is coupled to said third support means, for applying signals thereto in response to said further signals to drive said linear actuator means in opposition to any motion about the second axis.

* * * * *